United States Patent [19]

Compagnoni

[11] 4,446,670
[45] May 8, 1984

[54] SYSTEM TO UNIFORMLY FILL CASES WITH FRUIT AND VEGETABLES

[76] Inventor: Felice Compagnoni, 1165 Via Emilia, 41018 San Cesario Sul Panaro, Modena, Italy

[21] Appl. No.: 235,714

[22] Filed: Feb. 18, 1981

[30] Foreign Application Priority Data

Mar. 3, 1980 [IT] Italy .............................. 40015 A/80

[51] Int. Cl.³ .................. B65B 39/12; B65B 25/04
[52] U.S. Cl. ..................................... 53/244; 198/580
[58] Field of Search ............... 53/244, 248, 249, 259; 198/457, 580, 575, 598

[56] References Cited

U.S. PATENT DOCUMENTS

| | | |
|---|---|---|
| 1,656,444 | 1/1928 | Morris . |
| 2,003,097 | 5/1935 | Vickery .......................... 198/580 X |
| 2,797,540 | 7/1957 | Carlsen et al. ...................... 53/244 X |
| 2,889,676 | 6/1959 | Griffith ................................. 53/244 |
| 3,147,846 | 9/1964 | Huntoon ............................. 198/99 |
| 4,037,710 | 7/1977 | Brutcher ......................... 198/580 X |
| 4,194,343 | 3/1980 | Myers et al. ......................... 53/244 |
| 4,252,232 | 2/1981 | Beck et al. ...................... 198/580 X |

FOREIGN PATENT DOCUMENTS

1454834 of 0000 United Kingdom .

*Primary Examiner*—Horace M. Culver
*Attorney, Agent, or Firm*—Lowe, King, Price & Becker

[57] ABSTRACT

The invention concerns a system to fill the cases in a uniform manner with fruit and vegetables, that is to say a mechanical device, which sees to the levelled filling of cases by means of, for instance, apples, citrus fruits, artichokes and other similar products in the course of the working of same in the fruit and vegetable factories; the system consists of an entrance conveyor (5) of the cases (2) co-ordinated with the rotating platform (1) of the filling station and with the exit conveyor (8) arranged on frames based on the floor; of a feeding conveyor (11') equipped with a belt (13) with a diaphragm angularly movable (25) in order to have the product (12) flow into the circuit (C) involving the belt itself and the near parallel one (13), when the feeding has to be interrupted; the feeding conveyor (11') is mounted on a frame (14) with an elevated level and in perpendicular direction compared with that of the entrance and exit conveyors (5, 8) in correspondence of the rotating platform (1); above the latter at the end of the feeding belt (1') and in correspondence with it the distributing machine (27) is installed in a vertically movable and guided manner, equipped with a vertical belt (30), from which project the rubber blades (29), inclined towards the top in the descending part in order to receive the product (12) from the feeding belt (13) and to transfer it to the distributing belt (41), inclined towards the front and towards the bottom, followed by a chute (45); in the plan the distributing machine (27) appears to be shifted compared with the axis (A) of rotation of the platform (11) and is equipped with an excentric rotating brush (33) in order to have the product, which would tend to form a ring-shaped rise like a bun, roll towards said axis.

14 Claims, 10 Drawing Figures

SYSTEM TO UNIFORMLY FILL CASES WITH FRUIT AND VEGETABLES

BACKGROUND OF THE INVENTION

The prior state of art comprises a case filling system consisting of a conveyor belt equipped with product holding blades, installed on a frame formed by two consecutive sections: a first section on the feeding side, which is substabtially horizontal, and a second section inclined towards the bottom nearly at a right angle in order to enter into the case placed on a rotating platform and to distribute the product in it; the substantially horizontal part of the frame is hinged in order to allow the gradual moving of the distributing end away from the case bottom by the same degrees as the height of the product increases; the distributing end of the conveyor belt is inserted in the case excentrically compared with the rotation axis of the latter.

SUMMARY OF THE INVENTION

This prior state of art is liable to further improvements as to the feeding and distribution of the product as well as to the rotation of the cases in the filling station; in fact, when it is necessary to pass from one case to the other in the case of the system with the two section conveyor, the feeding must be stopped in order to avoid obstructions and the falling of the product and moreover the product tends to jump between the blade pairs getting damaged; the product tends to get damaged as well in the distribution as a consequence of the sudden jump at the moment of leaving the blades; the alternation of the cases on the rotating platform by means of drawing and replacement by a fork lift determines dead times harmful with regard to the production costs; finally, the two section conveyor distributes the product to form a bun, that is to say leaving the central area of the case and its four corners emptier, which means scarce utilization of the available volume.

From the aforesaid derives the need of solving the technical problem of finding a system allowing to work with continuity, that is without interruption of the feeding during the withdrawal of the case and allowing to reduce the case withdrawal time to an indispensable minimum; moreover, such a system must be conceived in such a way as to avoid jumps and falling of the product, particularly in case of delicate products such as apples and must, moreover, be able to fill the cases in a more complete and uniform manner. The invention solves the above said technical problem by adopting: a feed with storage unit consisting of two intercommunicating parallel belts equipped with a motion in an opposite direction; a feeding belt with a diaphragm, which intervenes in order to divert the product to the contiguous belt during the change of the case in the filling station, thus determining a circulation of the product between the two belts up to their complete filling; an entrance conveyor of the cases aligned with the rotating platform and with an exit conveyor; those parts of the entrance and exit conveyors contiguous to the rotating platform being lowerable in order to allow the rotation of the platform during the filling of the case; a vertically movable distributing machine with a re-ascent tracer, equipped with a vertical conveyor belt with blades inclined towards the top in its descent part in order to receive the product and to place it on a conveyor belt slightly inclined towards the front and towards the bottom, followed by a chute with a humpshaped cross section in order to distribute the product also to both sides, which deposits the product without jumping: the product is restrained by ragged rubber elements at the exit of said belt and said chute; a rotating brush applied sideways to the front inside towards the lower end of this machine is rotated in such a way as to push the product towards the centre of the rotating case. The advantages obtained by this invention are: absence of interruptions of the work preceding the feeding system thanks to the introduction of the storage unit consisting of the two intercommunicating belts arranged one alongside the other and transporting in opposite directions; no choking in the feeding system; no falling down of the product; gradual handling of the product along the whole line up to the deposition in the case and consequently impossibility of harmful and antiaesthetical damage, even of the more delicate products; uniform filling of the case; quick automatic replacement of the filled case; saving of time and labour.

BRIEF DESCRIPTION OF THE DRAWINGS

One way of carrying out the invention is illustrated—just to give an example—in the enclosed eight drawing tables, where.

DESCRIPTION OF PREFERRED EMBODIMENTS

Figure 1:
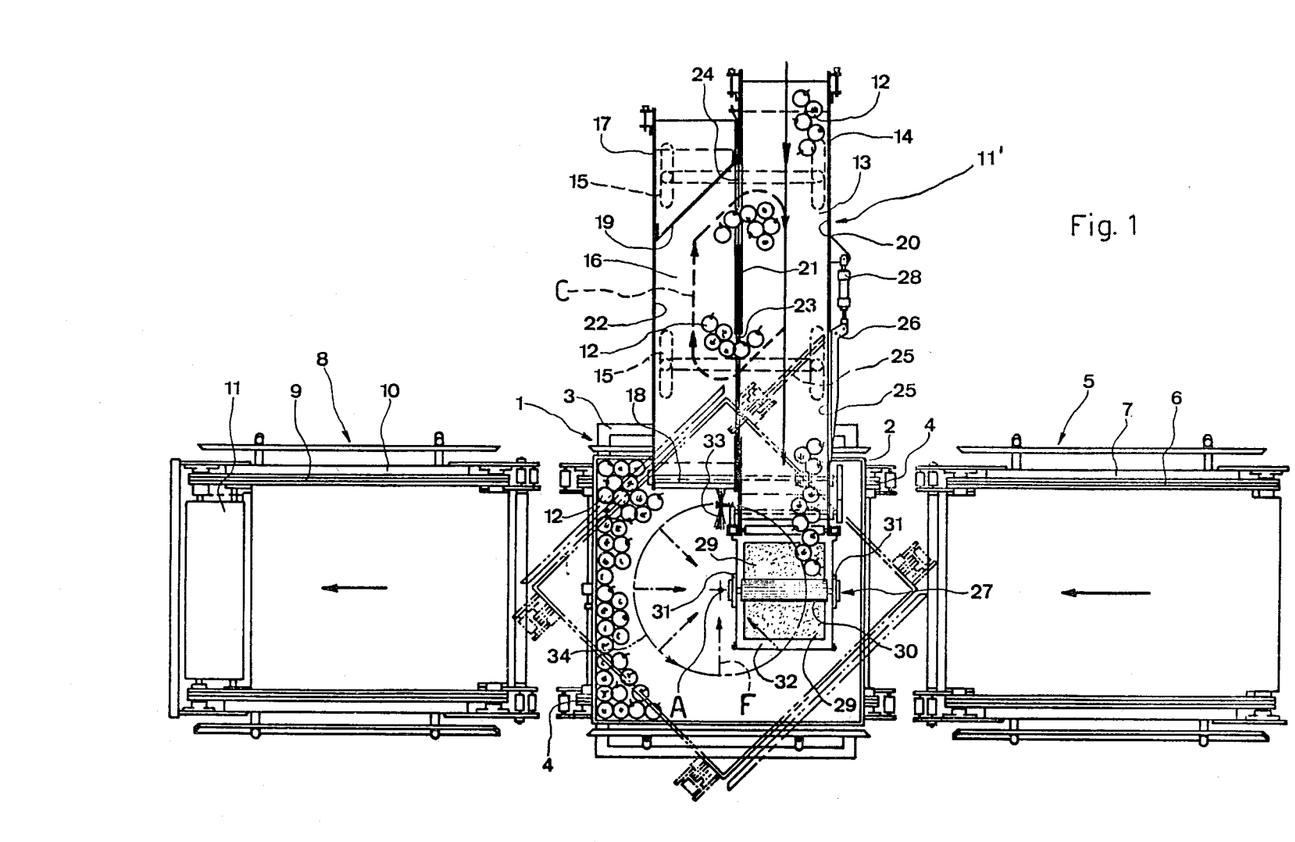
FIG. 1 is a plan view of the system according to the invention.
Figures 2, 3:
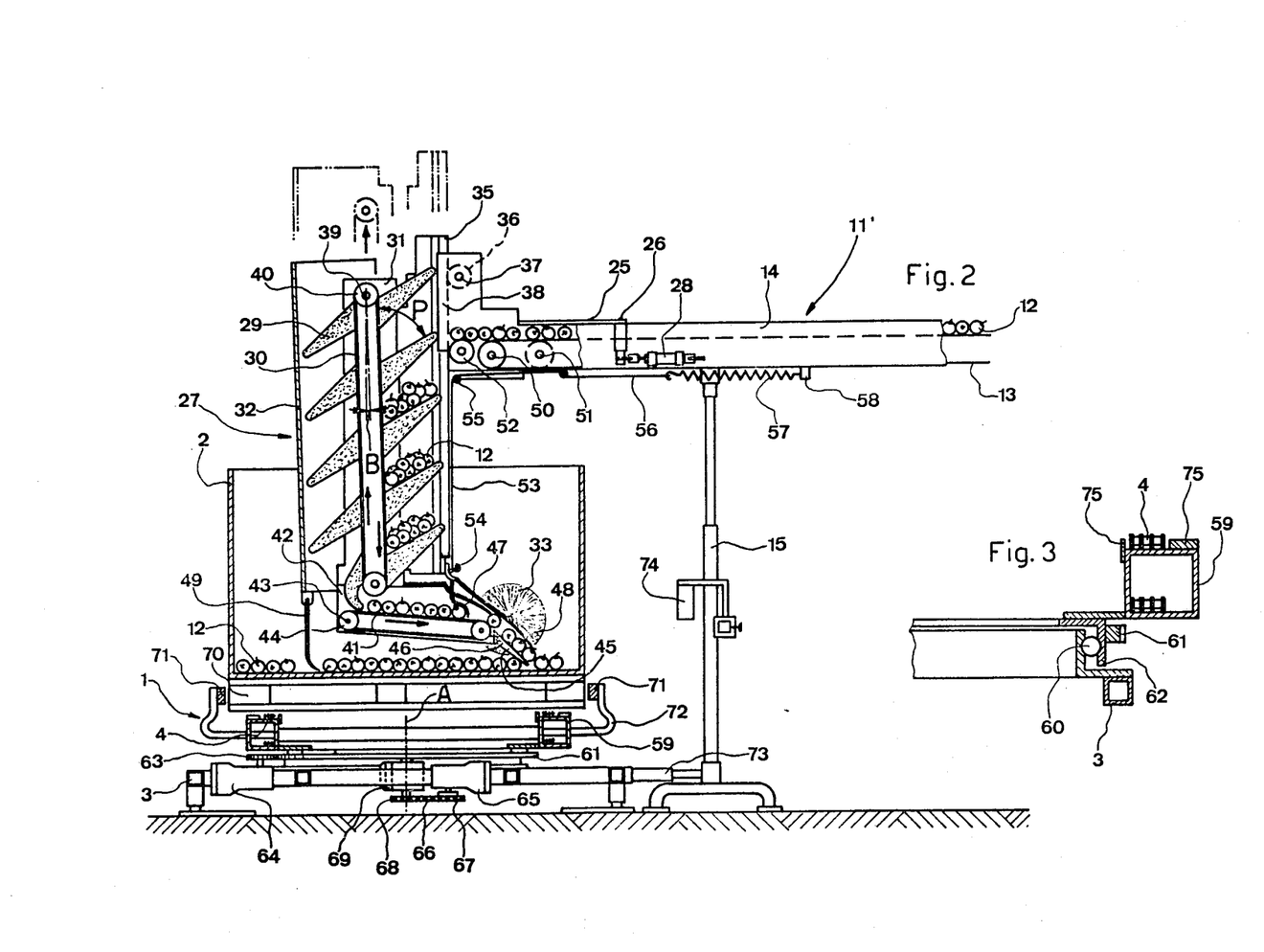
FIG. 2 is a longitudinal vertical section of the system with a case during the initial phase of the filling.
FIG. 3 is a blown-up section of the rotating coupling detail of the rotating platform, where the case with the support frame of the platform is placed during the filling.
Figure 4:
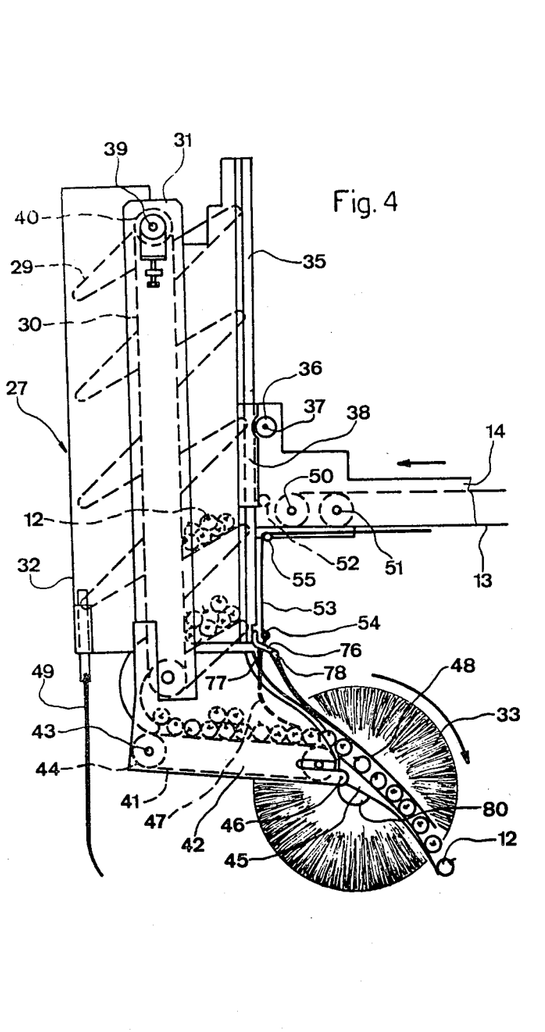
FIG. 4 is a partial left side view of the system of FIG. 2.
Figure 5:
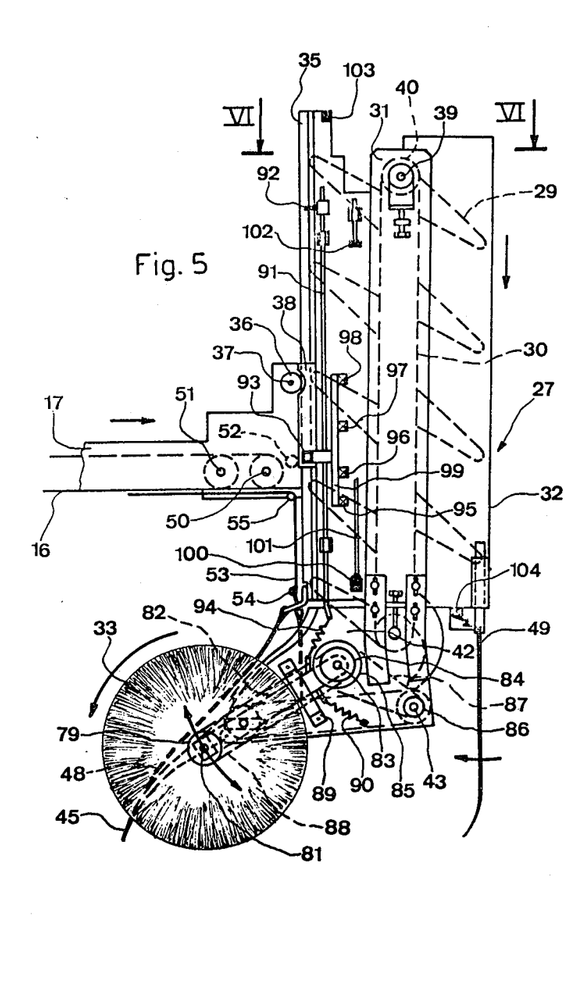
FIG. 5 is a partial right side view of the same system.
Figure 6:
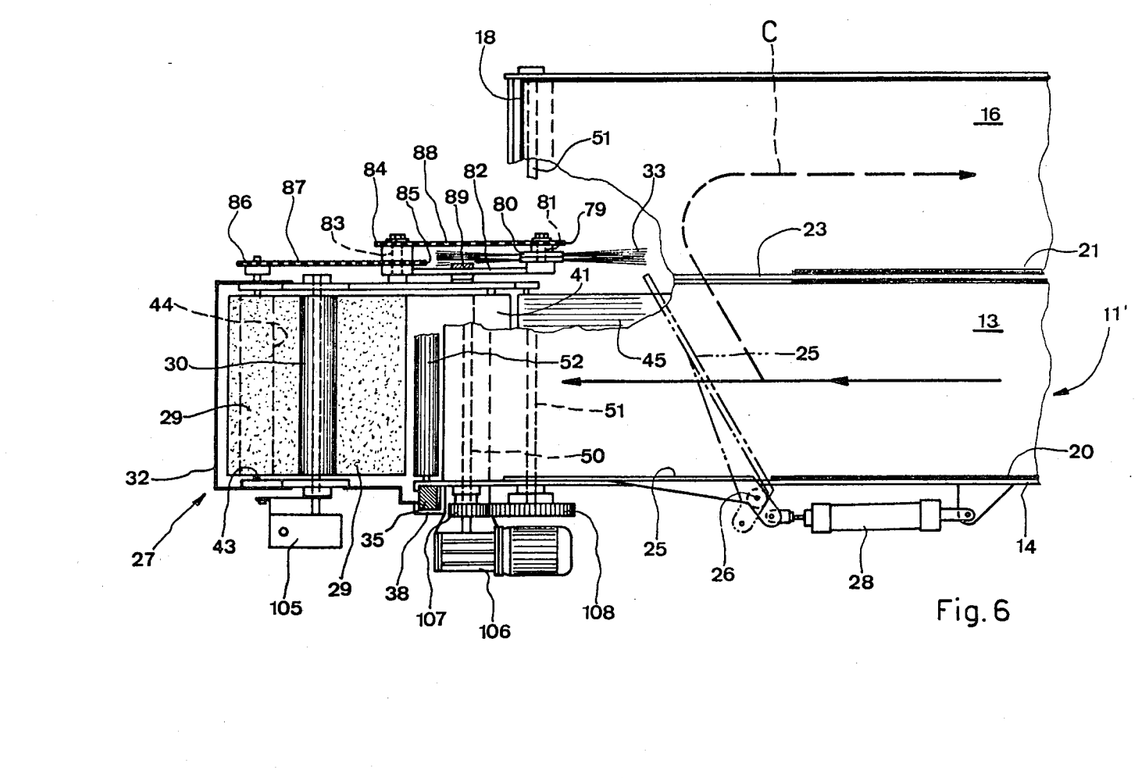
FIG. 6 is a partially cutaway top view of FIG. 5.
Figure 7:
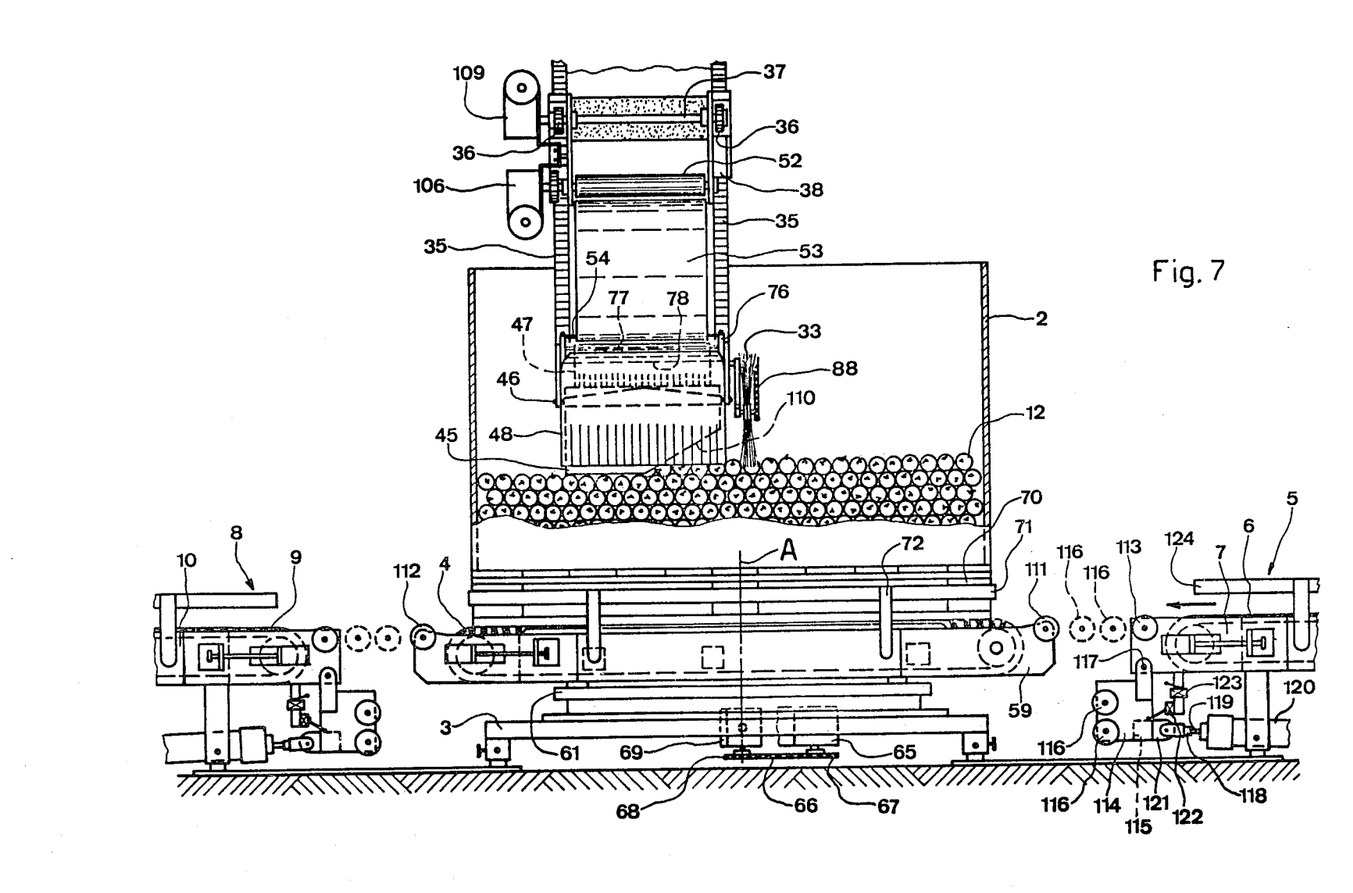
FIG. 7 is a partially cutaway front view from the product feed side of the system during the case filling phase.
Figure 8:
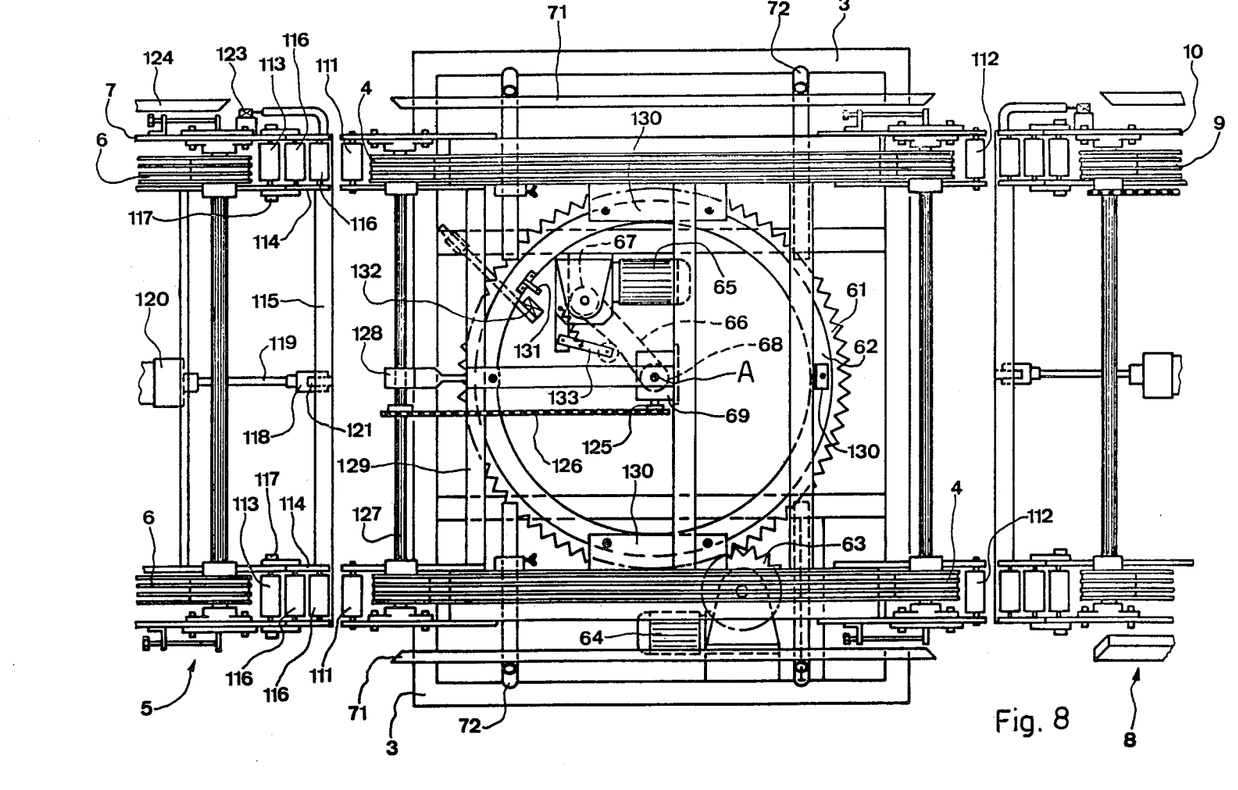
FIG. 8 is a plan view of the platform with the relative device producing its rotation movement and its alignment with the entrance and exit conveyors of the case.
Figure 9:
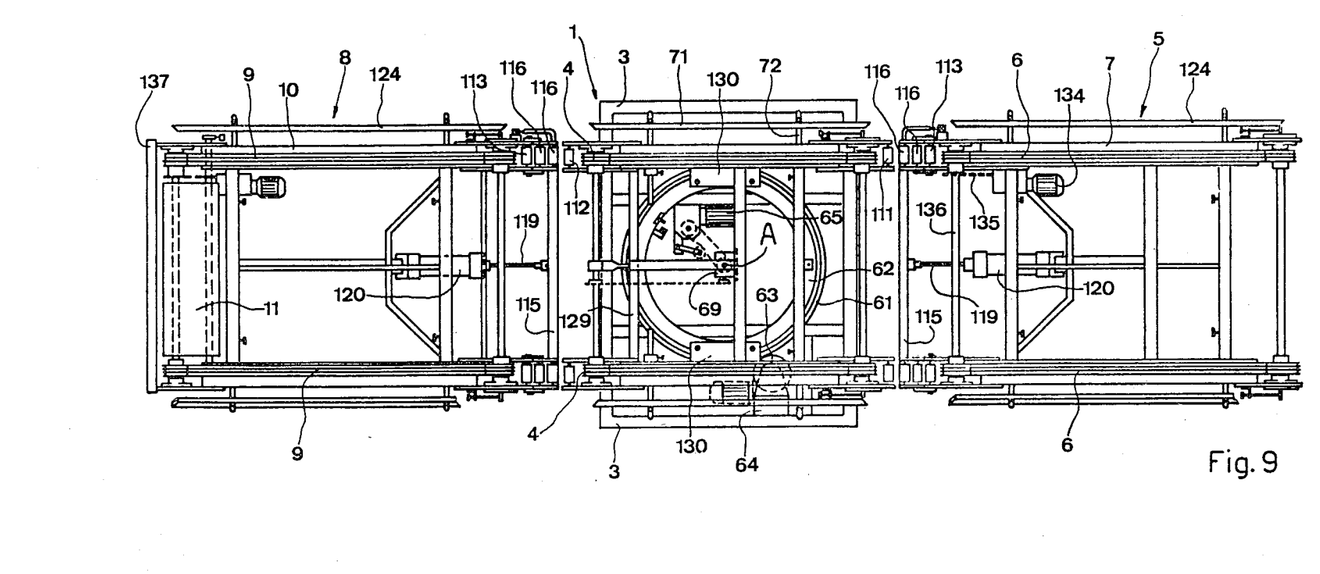
FIG. 9 is a plan view of the platform in line with the entrance and exit conveyors.
Figure 10:
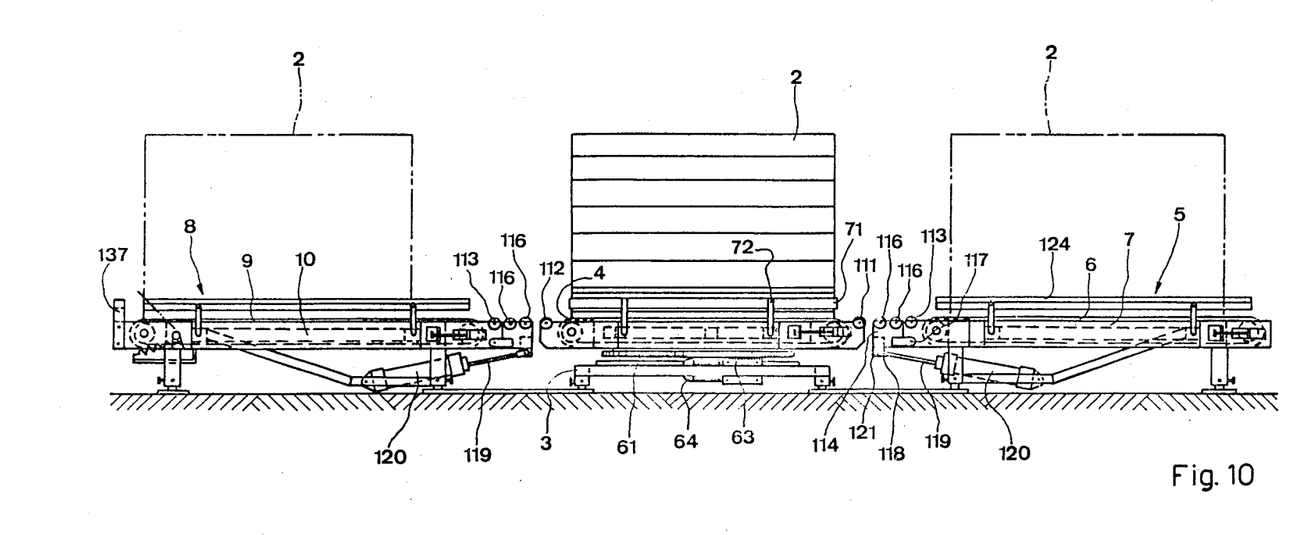
FIG. 10 is a side view of FIG. 9.

The indication are as follows: 1 indicates the case 2 depot platform during the filling phase, rotating compared to the base frame 3 around the vertical axis A; 4 indicates the pair of transversal conveyor chains arranged on platform 1; 5 is the entrance conveyor intended to receive and transfer the empty cases, equipped with transversal conveyor chains 6 installed on the base frame 7; 8 indicates the exit conveyor intended to receive and remove the full cases, equipped with conveyor chains 9 installed on the base frame 10; 11 is a case stop element at the end of conveyor 8; 11' is the conveyor of the product 12 to be introduced into the case 2, equipped with a feeding belt 13, the frame of which 14, perpendicular to the line of conveyors 5 and 8 and to the platform 1, is supported by the pavement by means of vertical rods 15, adjustable at a convenient height; 16 is a lateral conveyor belt for the re-flow of the product 12, transporting in a sense opposite to that of belt 13, the frame of which 17 is supported by the vertical rods 15 at the same height as the belt 13; 18 is a product 12 stop diaphragm at the end of the belt 16; 19 is a product 12 diverting diaphragm; 20, 21, 22 indicate respectively the outer sideboard of belt 13, the separating partition between the belts 13 and 16 and the outer sideboard of belt 16; 23 and 24 are two interruptions of the partition 21 to allow the re-flow of the material 12 along the circuit C in the case of lack of the case in the filling station or when the case is already full; 25 indicates an angularly movable diaphragm hinged to frame 14 at 26 that can be operated to obstruct the introduction of the product 12 into the distributing machine 27 by means of a pneumatic operation cylinder 28 hinged to frame 14; 29 indicates inclined flexible rubber blades 29, fastened in an overhanging way along a vertical conveyor belt 30 suitable for receiving the product 12 in order to transfer it towards the bottom to the case 2; 31 indicates the vertically movable stanchions of the support frame of the shafts of the drums of belt 30, to which the rear casing 32 with a C-shaped profile in plan view is fastened; 33 is a vertical disk brush supported in a revolving manner by an appendix of the stanchions 31 intended to have the product 12, which shows a tendency to arrange along the periphery 34, roll towards the centre of the case 2 according to the arrows F; 35 indicates (FIG. 2) a pair of vertical racks fastened to the frame with the stanchions 31, meshing with the pinion pair 36 keyed on the driving shaft 37, supported in a revolving manner by the shaped front part of the frame 14, forming, moreover a guide 38 for the vertical sliding of distribution unit 29, 30, 31, 32, 33; 39 is the driving shaft of the drum 40 of the belt 30; B indicates the angle (from approximately 10° to approximately 25°) formed with the vertical by the belt 30 axis in order to increase the adherence of the material 12 to the belt; P is the angle (from approximately 50° to approximately 70°) formed by the loading level of a blade 29 with the belt 30; 44 is a belt for distribution of the product 12 to the case 2, inclined to the front towards the bottom by some degrees, mounted in such a way that it is adjustable in height and inclination on the frame 42 fastened to the lower part of the stanchions 31; 43 is the drum 44 driving shaft of the distributing belt 41; 45 is a chute, transversally shaped to a hump, oscillating and hinged to the exit end of frame 42 at 46; 47 and 48 indicate ragged rubber elements intended to restrain and regularize the exit and the falling of the product; 49 is an oscillating lower appendix, hinged to the casing 32 in such a way that it is adjustable in height, functioning as a tracer of the level reached by the product 12 in the case 2, 50 and 51 indicate respectively the driving shafts of belt 13 and belt 16; 52 is a roller for the passing of the product 12 from the belt 13 to the blades 29; 53 is a belt functioning as a front holding wall of the product 12 transported by the blades 29, at the bottom fastened to the rack pair 35 at 54 and at the top driven by the roller 55, the end of which is fastened to the fork 56, which is elastically connected with the appendix 58 of frame 14 by means of a helical spring 57; 59 is an intermediate frame coupled by means of a thrust bearing 60 (FIG. 3) to the base frame 3 underneath the rotating platform 1 in order to support the chains 4; 61 indicates a crown gear supported by the rotating ring 62 of the bearing 60, operated by the pinion 63 of the geared motor 64 arranged on the frame 3; 65 indicates a reduction gear installed on frame 3 in order to operate the chains 4 rotating together with 59 by means of chain 66, wound on one side on a neutral pinion 67 and on the other side on a gear wheel 68 keyed on the angular transfer case 69 fastened to the rotating frame 59; 70 indicates a case support base, in its turn resting on the chains 4, equipped with a recess to allow the insertion of the fork lift; 71 indicates a pair of lateral elements for the holding and centering of the support base 70, sustained at the rotating frame 59 in an adjustable manner by means of the supports 72; 73 indicates a pair of elements connecting by stiffening the pair of stanchions 15 and the frame 3; 74 indicates two photoelectric cells arranged on each stanchion 15 in order to give permission to the filling of the case 2, when it is centered on the platform 1; 75 indicates wings for the guiding of chain 4 on the frame 59; 76 (FIG. 4) indicates a pair of arms fastened to the lower end of the rack pair 35 interconnected by a pair of cross members 77 and 78 for the attachment of the rubber elements 47 and 48; 79 (FIG. 5) is a pinion keyed on the hub 80 of the brush 33, idle on the pivot 81 of the arm 82 hinged in the pivot 83 of the frame 42; 84 and 85 indicate two pinions, integral one with the other and idle on pivot 83; 86 is a pinion keyed to shaft 43; 87 is a chain embracing the pinions 86 and 85 in order to transmit the motion from the driving shaft 43 to the pinion 84, in its turn connected to the pinion 79 of the brush 33 by means of a chain 88; 89 indicates a staple fastened on the frame 42 in order to limit the oscillation of the arm 82; 90 indicates a helical spring fastened between the arm 82 and the frame 42 in order to keep the brush adherent to the surface of the product 12 introduced into the case 2, 91 is a vertical rod sliding along the vertical supports 31, equipped with a striker 92 intended to strike against the stop 93, fastened to the outside of a guide 38 at the lower end of the stroke of the unit distributing the product 12 in the case 2; 94 is a helical spring fastened to the lower end of the rod 91 and to the arm 82 in order to re-lift the brush 33 from the bottom of the case 2, before the first layer of the product is formed; 95, 96, 97, 98 are microswitches fastened in an adjustable manner on the fixed vertical rod 99 intended to strike on the counterpieces 100, 101, 102, 103 for the stopping of the rise of the distribution unit 29, 30, 31, 32, 33, for termination of the feed of the case 2, when it is full; to allow the descent of the distribution unit and the opening of the feed; to stop the descent of said distribution unit and allow the rotation of the platform 1; 104 indicates a microswitch operated by the tracer 49 in order to lifft the distribution unit so mush as to remain with the height of the layer of product 12 formed below it; 105 (FIG. 6) is a geared motor operating the shaft 39 of the belt 30; 106 indicates a geared motor operating the shafts 50, 51 corresponding respectively to the belts 13 and 16 by means of gears 107, 108; 109 (FIG. 7) indicates a geared motor for the operation of the shaft 37, equipped with pinions 36 coupled to the racks 35; 110 is a chamfer directed towards the centre of the case to favour the falling of the product 12 in that direction; 111 and 112 indicate two pairs of rollers of the frame 59; 113 indicates a pair of end rollers of frame 7; 114 indicates two pairs of tilting forks interconnected by the cross piece 115 in order to support a roller pair 116 each; 117 is the hinge pin of each fork pair 114, hinged to the inner end of the frame 7; 118 is the end of the rod 119 of the pneumatic operation cylinder 120 hinged below frame 7: the end 118 is hinged to the central lug 121 of the cross piece 115; 122 and 123 are two microswitches fastened to the frame 7, respectively to give permission for the rotation of the platform 1, when the fork pairs 114 are tilted towards the bottom, and to give permission for the transport of case 2, when the forks are raised and their rollers 116 are level with the chains 6 and 14; 124 indicates a pair of lateral guides of case 2, fastened to frame 7; it is to be observed that the components corresponding to the conveyor 5 and numbered from 113 to 124 are identically reproduced in the initial part of the conveyor 8; therefore they are not numbered; 125 (FIG. 8) indicates a horizontal shaft of the transfer gear box 69 for the operation of chain 126, in its turn driving the shaft 127 of the chain pair 4; 128 is a strut of shaft 127 fastened to the cross piece 129 of the rotating frame 59; 130 indicates lugs fastened to the rotating ring 62 of the bearing 60 in order to connect the ring with the frame 59; 131 is a counterpiece of the ring 62 intended to hit the microswitch 132 determining the stopping of the rotation of the frame 59 in a position of alignment with the conveyors 5, 8; 133 is a stretcher of the chain 66 driving the chain 4; 134 (FIG. 9) is a geared motor driving the shaft 136 of the chain pair 6 by means of chain 135; the components from 134 to 136 are repeated in the conveyor 8, where they are not numbered for this reason; 137 is a safety stop.

The operation takes place in the following way: the empty case 2 is transferred to the depot platform 1 by the entrance conveyor 5 driven by the geared motor 134 (FIG. 9); then the geared motor 109 (FIG. 7) control the descent of the distributing machine 27 while the two operation cylinders 120 move the forks 114 in such a manner that the rollers 116 descend beneath the level of platform 1 in such a position as to allow its rotation, the rotation being driven by the geared motor 64 (FIG. 8); when the front end of the chute 45 (FIG. 2) comes into contact with the bottom of the case 2, the descent of the distributing machine 27 stops; previously, the contact of the striker 92 (FIG. 5) with the stop 93 being reached, the rod 91 had lifted the arm 82 angularly by means of a spring 94 in such a way as to keep the brush 33, supported in a rotating manner by same arm, lifted from the bottom as much as is the height of the layer of product 12, while the descent of the machine 37 continues; as for the product 12 feed, the conveyor belts 13 and 16 being in motion since the beginning, the product is circulating along the circuit C (FIG. 1); during the descent of the distributing machine 27, the cylinder 28 controls the opening of the diaphragm 25 so that the product 12 is accumulated on the blades 29 of the vertical belt 30, driven at the same time as the diaphragm by the geared motor 105 (FIG. 6), which controls also the inclined belt 41 and the brush 33; thus the product 12 falls along the chute 45, restrained by the ragged elements 47 and 48, reaching the bottom of the case 2, where the product 12 is distributed owing to its rotation already in movement, the position of the machine 27 being excentric compared with the axis A (see also FIG. 1); when the tracer 49 (FIG. 2) meets the first element of the product 12, the machine 27 is operated to rise as much as is the height of the product 12 by the geared motor 109, the product continuing to flow onto the bottom of the case 2, beginning the formation of the second layer along a ring shaped area determined by the excentricity of the chute 45 compared with the axis A (FIG. 1); the brush 33, moving approximately in the middle circumference of said area, remains out of duty in a fixed height position until the product 12 reaches a height equal to some layers, depending on the diameter of the product; then the striker 92 returns towards the top compared with the stop 93, and the brush 33 begins to rise again together with its arm 82, balanced between the springs 94 and 90, and with the machine 27; the rotation of the brush 33 being directed towards the axis A, the brush itself pushes the product 12 to roll towards the axis; thus, the product 12 placed along a ring-shaped area similar to a bun with a central line 34, is distributed in the case 2 at an even height, as the brush 33 rolls the product, which tends to accumulate in the part of said area, lowering towards the centre, to the centre, whereas the product moving out of the chute 45 towards the walls of the case 2, is distributed towards them; once the case is full, the cylinder 28 operates the closing of the diaphragm 25 in order to allow the emptying of the blades 29; then the rotation of the platform 1 stops, when the chain pair 4 is aligned with the chain pairs 6 and 9 respectively of the conveyors 5 and 8 in one direction or the other; the operating cylinders 120 turn to lift the rollers 116, re-establishing the continuity of the loading and unloading level for the manoeuvre of removing the case 2.

In the practical realization the materials, the dimensions, the execution details may be different from those indicated but must be technically equivalent without leaving the juridical dominion of this invention. Thus, the entrance and exit conveyors (5, 8) could be inverted between each other.

I claim:

1. A product filling system for uniformly filling cases with fruit, vegetables or the like, comprising:
   (a) a case entrance conveyor;
   (b) a rotating platform positioned on a base frame to receive an empty case discharged from the entrance conveyor, said platform being rotatable about a vertical axis to distribute product within the case;
   (c) a case exit conveyor arranged to receive and convey filled cases away from the platform; and
   (d) means for feeding product into a case positioned on the rotating platform, said means including an upper conveyor means and a generally vertical conveyor means arranged to receive product from said upper means and convey same into the case, said vertical conveyor means including a generally vertical conveyor belt passing around drum means and plural flexible blades attached in cantilevered, spaced locations to the vertical belt, said blades being upwardly inclined to receive and support product discharged from the upper means against the vertical belt and thereby lower said product into the case in controlled movement, said upper conveyor means including a first belt feeding product towards the vertical belt and a second belt moving in the direction opposite the first belt, said first and second belts being substantially coplanar with and laterally adjacent each other, and means located to recirculate product between the first and second belts to thereby direct product away from the vertical conveyor between filling operations of in line cases.

2. The product filling system of claim 1, further including a distributing belt positioned beneath the vertical conveyor belt, said distributing belt being inclined downwardly to direct product discharged from the vertical conveyor blades passing around the lower end of the vertical conveyor means into the case.

3. The system of claim 2, wherein said drum means includes rollers mounted on shafts supported by support frame means having vertically movable stanchions, said stanchions carrying a rear casing of C-shaped profile, and wherein the longitudinal axis of said vertical conveyor belt is eccentrically located with respect to the rotational axis of said rotating platform, and means provided on a frame attached to a lower part of said stanchions for adjusting the height and inclination of said distributing belt to enable said flexible blades to engage the distributing belt and flex to discharge product thereon.

4. The system of claim 3, further including an oscillating chute hinged to said frame attached to the lower part of said stanchions to direct product from the distributing belt towards the bottom of said case, said chute cooperating with said distributing belt to arrange product along areas adjacent side walls of the case.

5. The system of claim 4, further including a generally vertically extending disc brush rotatably supported on a lateral lower extension of said vertically movable stanchions by an oscillating arm, said brush being arranged to direct product towards the center of said case.

6. The system of claim 5, wherein said upper conveyor means includes side body members extending along outer sides of said first and second belts and a partioning body member located between the first and second belts and having a pair of openings located respectively at opposite ends of the belts enabling lateral communication therebetween, said product recirculating means including a stop diaphragm and a product diverting diaphragm respectively provided at upstream and downstream ends of said second belt, and an angularly movable diaphragm laterally hinged to frame means at a downstream end of said first belt to thereby recirculate product through said partition openings.

7. The system of claim 5, further including a pair of generally vertical racks attached to said support frame in meshing engagement with pinions keyed on a horizontal driving shaft rotatably supported by a front part of the first belt frame, said front part of said frame forming a guide surface to assure vertical sliding movement of each said vertical conveyor belt, rear casing and vertical disc brush.

8. The system of claim 5, wherein the longitudinal axis of said vertical conveyor belt is inclined away from the first belt approximately 10° to 25° from the vertical and wherein each flexible blade is inclined at an angle of approximately 50° to 70° with respect to the vertical conveyor belt.

9. The system of claim 7, further including a pair of arms attached to a lower end of one of said vertical racks and a pair of cross members interconnecting said arms, further including plural skirts defining flap members attached to the cross members whereby product enters the case through said flaps in a controlled manner.

10. The system of claim 5, further including belt means extending adjacent the flexible blades to define a retaining wall for maintaining product on said blades, wherein said belt means is attached at a bottom end to said vertical racks, the top of said belt passing around a roller, an end of said roller being attached to a fork elastically connected with a lug to said first belt frame by spring means.

11. The system of claim 5, wherein said vertical rotating disc brush is driven by a driving shaft of said distributing belts.

12. The system according to claim 5, further including a bracket fastened to the support frame to limit oscillation of said oscillating arm, a first helical spring being attached between said oscillating arm and support frame to maintain the brush in contact with a surface of the product, a second helical spring being attached between said oscillating arm and a lower end of a vertical rod slidable along said vertically movable stanchions to lift said brush from the bottom of the case, said vertical rod having a striker engageable with a stop means attached to an outer part of said shaped front part of the first belt frame at a lower end of the stroke of said vertical conveyor belt.

13. The system of claim 5, wherein said rotating platform includes first transverse conveyor chains supported by an intermediate frame having a pair of rollers, said intermediate frame being coupled to said base frame beneath the rotating platform by means of a thrust bearing, and a ring gear supported by the rotating ring of said thrust bearing and being driven by a pinion of a gear motor arranged on said base frame, and further including reduction gear means connected to said base frame to operate the first transverse conveyor chains.

14. The system of claim 5, wherein said case entrance and exit conveyors include second and third transverse conveyor chains respectively, said second and third conveyor chains being mounted on second and third base frames with a pair of end rollers mounted on each second and third frame, said end rollers being aligned with rollers of said first base frame and a roller pair supported by a pair of tilting forks being respectively inserted between each said end roller and the corresponding roller mounted on the first base frame, said two pairs of tilting forks being hinged to an inner end of each second and third base frame.

* * * * *